United States Patent
Rodriguez, Jr. et al.

(10) Patent No.: US 10,412,471 B2
(45) Date of Patent: *Sep. 10, 2019

(54) DATA COMMUNICATION APPARATUS, SYSTEM, AND METHOD

(71) Applicant: 3M INNOVATIVE PROPERTIES COMPANY, St. Paul, MN (US)

(72) Inventors: Ernesto M. Rodriguez, Jr., Austin, TX (US); Vaughn G. Amann, Austin, TX (US); Lars Schrix, Duisburg (DE); Jens Weichold, Erkelenz (DE); Ann-Maud B. Laprais, Paris (FR); David H. Redinger, Afton, MN (US); Ronald D. Jesme, Plymouth, MN (US); David J. Badzinski, Blaine, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,977

(22) Filed: Apr. 30, 2018

(65) Prior Publication Data

US 2018/0249230 A1 Aug. 30, 2018

Related U.S. Application Data

(63) Continuation of application No. 15/318,879, filed as application No. PCT/US2015/036345 on Jun. 18, 2015, now Pat. No. 9,961,418.
(Continued)

(30) Foreign Application Priority Data

Sep. 10, 2014 (WO) ............... PCT/US2014/054905

(51) Int. Cl.
*H04Q 9/00* (2006.01)
*G05B 15/02* (2006.01)
(Continued)

(52) U.S. Cl.
CPC ............... *H04Q 9/00* (2013.01); *G05B 15/02* (2013.01); *H04B 1/40* (2013.01); *H04L 63/0428* (2013.01);
(Continued)

(58) Field of Classification Search
CPC . H04Q 9/00; H04B 1/40; G05B 15/02; H04L 63/0428
See application file for complete search history.

(56) References Cited

U.S. PATENT DOCUMENTS

| 4,949,174 A | 8/1990 | Wiltshire |
| 6,051,977 A | 4/2000 | Masuda et al. |

(Continued)

FOREIGN PATENT DOCUMENTS

| EP | 2947466 | 11/2015 |
| JP | 2002-223481 A2 | 8/2002 |

(Continued)

OTHER PUBLICATIONS

Channel IQ products webpage, [online < http://www.channeliq.com/> retrieved on Apr. 11, 2016], 4 pages.

(Continued)

*Primary Examiner* — Leon Flores
(74) *Attorney, Agent, or Firm* — Gregg H. Rosenblatt

(57) ABSTRACT

A data communication apparatus, system, and method are described. The data communication system comprises a transceiver disposed on an entrance port to an enclosure, such as an underground enclosure. The transceiver includes a housing, the housing mountable to the entrance port, wherein the transceiver is configured to communicate with a network outside of the underground enclosure. The data communication system also includes a monitoring device disposed in the underground enclosure that provides data related to a real-time condition within the underground (Continued)

enclosure. The data communication system also includes a sensor analytics unit to process the data from the monitoring device/sensor and generate a processed data signal and to communicate the processed data signal to the transceiver.

19 Claims, 11 Drawing Sheets

Related U.S. Application Data

(60) Provisional application No. 62/138,176, filed on Mar. 25, 2015, provisional application No. 62/014,764, filed on Jun. 20, 2014.

(51) Int. Cl.
*H04L 29/06* (2006.01)
*H04B 1/40* (2015.01)

(52) U.S. Cl.
CPC ..... *H04Q 2209/40* (2013.01); *H04Q 2209/88* (2013.01)

(56) References Cited

U.S. PATENT DOCUMENTS

| | | | |
|---|---|---|---|
| 6,272,346 B1 | 8/2001 | Fujinami | |
| 6,551,014 B2 | 4/2003 | Khieu | |
| 7,002,481 B1 | 2/2006 | Crane et al. | |
| 7,221,282 B1 | 5/2007 | Ross et al. | |
| 7,322,252 B1 | 1/2008 | Rodgers | |
| 7,589,630 B2 | 9/2009 | Drake | |
| 7,598,858 B2 | 10/2009 | Quist et al. | |
| 7,943,868 B2 | 5/2011 | Anders | |
| 8,135,352 B2 | 3/2012 | Langsweirdt | |
| 8,237,576 B2 | 8/2012 | Wander | |
| 8,258,977 B1 | 9/2012 | Montestruque | |
| 9,546,466 B2 | 1/2017 | Wander | |
| 9,961,418 B2 * | 5/2018 | Rodriguez, Jr. ......... | H04Q 9/00 |
| 2001/0024165 A1 | 9/2001 | Steen, III et al. | |
| 2006/0271312 A1 | 11/2006 | Hayes et al. | |
| 2007/0103324 A1 | 5/2007 | Kosuge et al. | |
| 2007/0159326 A1 | 7/2007 | Quist et al. | |
| 2007/0229295 A1 | 10/2007 | Curt | |
| 2008/0060430 A1 | 3/2008 | Galloway et al. | |
| 2008/0074283 A1 | 3/2008 | Verkleeren | |
| 2008/0109889 A1 | 5/2008 | Bartels | |
| 2008/0174424 A1 | 7/2008 | Drake | |
| 2008/0179115 A1 | 7/2008 | Ohm et al. | |
| 2008/0224542 A1 | 9/2008 | Freeman | |
| 2008/0284585 A1 | 11/2008 | Schweitzer | |
| 2009/0202112 A1 | 8/2009 | Nielsen et al. | |
| 2009/0303039 A1 | 12/2009 | Drake | |
| 2010/0046545 A1 | 2/2010 | Kagan | |
| 2010/0228588 A1 | 9/2010 | Nielsen et al. | |
| 2010/0265062 A1 | 10/2010 | Ku | |
| 2012/0268290 A1 | 8/2012 | Lee et al. | |
| 2012/0206270 A1 | 10/2012 | Huang et al. | |
| 2013/0196593 A1 | 8/2013 | Roper | |
| 2015/0066397 A1 | 3/2015 | Quist et al. | |
| 2015/0112647 A1 | 4/2015 | Currin et al. | |
| 2015/0308627 A1 | 10/2015 | Hoskins et al. | |
| 2015/0338035 A1 | 11/2015 | Jacobson et al. | |
| 2016/0225248 A1 | 8/2016 | Rodriguez, Jr. et al. | |

FOREIGN PATENT DOCUMENTS

| | | |
|---|---|---|
| JP | 2004-364436 | 12/2004 |
| JP | 2006-167665 | 6/2006 |
| WO | WO 2014-209739 | 12/2014 |
| WO | WO 2015-041906 | 3/2015 |

OTHER PUBLICATIONS

Elan products webpage, [online < http://www.elantechnologies.net > retrieved on Apr. 11, 2016], 2 pages.
"How to locate underground faults on cable?" Electrical Engineering portal, [online < http://electrical-engineering-portal.com/how-to-locate-underground-faults-on-cable> retrieved on Sep. 5, 2013], 7 pages.
Mide Piezoeletric products webpage, [online <http://www.mide.com/collections/piezoelectric-products>, retrieved on Apr. 11, 2016], 5 pages.
Oagaro et al, "Multi-Sensor Data Fusion using Geometric Transformations for Gas Transmission Pipeline Inspection." IEEE Instrumentation and Measurement Technology Conference Proceedings, May 2008, pp. 1734-1737.
Slootweg, "Incorporating reliability calculations in the routine network planning; theory and practice", 18$^{th}$ International Conference on Electricity Distribution, Jun. 2005, 5 pages.
Zervos, "Thermoelectric Energy Harvesting 2014-2024: Devices, Applications, Opportunities", High power energy harvesting, [online < http://www.idtechex.com/research/reports/thermoelectric-energy-harvesting-2012-2022-devices-applications-opportunities-000317.asp> retrieved on Apr. 11, 2016], 10Pages.
International Search Report for PCT International Application No. PCT/US2014/054905 dated Dec. 24, 2014, 2 pages.
International Search Report for PCT International Application No. PCT/US2015/036345, dated Sep. 18, 2015, 3 pages.
Francisc Zavoda et al., "Universal IED for Distribution Smart Grids", Jun. 10-13, 2013 Stockholm, Proc. CIRED Conf 2013, Paper 0863, 4pgs.
EP Search Report for EP patent application No. EP 15809968, dated Jan. 19, 2018, 2pgs.

* cited by examiner

DATA COMMUNICATION APPARATUS, SYSTEM, AND METHOD

BACKGROUND

Machine to machine communication is becoming increasingly important to the energy, communications, and security markets, among others. Supervisory Control and Data Acquisition (SCADA) systems used in those industries rely on inputs from remotely located sensors to function properly. SCADA systems can also output signals to actuate remote equipment in the field. A sizeable portion of that equipment (~18% for U.S. electric utilities) is located underground, and providing wireless communications between above ground and underground equipment is a serious challenge.

Current methods used to locate underground cable faults are still slow and labor intensive. Even relatively short outages can be used against utilities and lead to rate adjustments for customers, so a faster means of locating and fixing underground faults is needed.

Thus, there is a need for communicating wireless signals into and out of underground equipment vaults and other structures where underground equipment is located.

SUMMARY OF THE INVENTION

In one aspect of the invention, a data communication system comprises a transceiver disposed on an entrance port to an enclosure, such as an underground or grade level enclosure. For the underground enclosure environment, the transceiver includes a housing, the housing mountable to the entrance port, wherein the transceiver is configured to communicate with a network outside of the underground enclosure. The data communication system also includes a monitoring device, such as a sensor, disposed in the enclosure that provides data related to a real-time condition within the enclosure. The data communication system also includes a sensor analytics unit to process the data from the monitoring device/sensor and generate a processed data signal and to communicate the processed data signal to the transceiver.

In another aspect, the sensor detects at least one of: power, voltage, current, temperature, combustible materials or byproducts of combustion, mechanical strain, mechanical movement, humidity, soil condition, pressure, hazardous atmosphere, liquid flow, leakage, component end-of-life or lifetime, personnel presence, physical state, light level, and vibration. In a further aspect, the sensor is incorporated in a sensored cable accessory and is configured to monitor a condition of a power cable.

In yet another aspect, the sensor analytics unit includes a digital signal processor. In another aspect, the sensor analytics unit includes a wireless network communications chip.

In another aspect, the transceiver unit includes a hardened above ground antenna and radio. In another aspect, the transceiver is configured to send aggregated information upstream to another aggregation node or cloud server above ground. In a further aspect, the aggregated data comprises one or more of periodic status notification and asynchronous alarm notification.

In another aspect, the entrance port comprises a manhole cover. In a further aspect, the transceiver is secured to the manhole cover and a portion of the transceiver housing extends through a hole formed in the entrance cover. In yet another aspect, the transceiver housing portion extending through the hole formed in the entrance cover is substantially flush with a top surface of the entrance cover.

In another aspect, the entrance port comprises a manhole cover and a ring portion to receive the manhole cover, wherein the transceiver is secured to the ring portion of the entrance port.

In another aspect, the data communication system further comprises a power harvesting device coupled to at least one power line located in the underground enclosure.

In another aspect, the power harvesting device is coupled to the sensor analytics unit and provides power to the sensor analytics unit.

In another aspect of the invention, a data communication system comprises a transceiver disposed on an entrance port to an underground enclosure. The transceiver includes a housing mountable to the entrance port, wherein the transceiver is configured to communicate with a network outside of the underground enclosure. The system also includes a sensored cable accessory mounted to a power line located in the underground enclosure, the sensored cable accessory including a sensor that measures data related to a real-time condition within the underground enclosure. The sensored cable accessory also includes a signal processing chip to process the measured data and a communication chip to communicate processed data to the transceiver.

In another aspect, the sensored cable accessory further comprises a power harvesting device coupled to the power line to provide power to the signal processing chip and communication chip.

In another aspect of the invention, a data communication system comprises a transceiver disposed on a portion of an enclosure containing utility equipment, the transceiver including a housing, the housing mountable to the enclosure, wherein the transceiver is configured to communicate with a network outside of the enclosure. The system also includes a monitoring device, such as a sensor, disposed in the enclosure that provides data related to a real-time condition within the enclosure. The system also includes a sensor analytics unit to process the data from the monitoring device/sensor and generate a processed data signal. The processed data signal can be communicated to the transceiver.

In another aspect, the enclosure comprises an underground vault. In a further aspect, the enclosure comprises a grade level or above-ground enclosure.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The invention will be described hereinafter in part by reference to non-limiting examples thereof and with reference to the drawings, in which.

Figure 1:
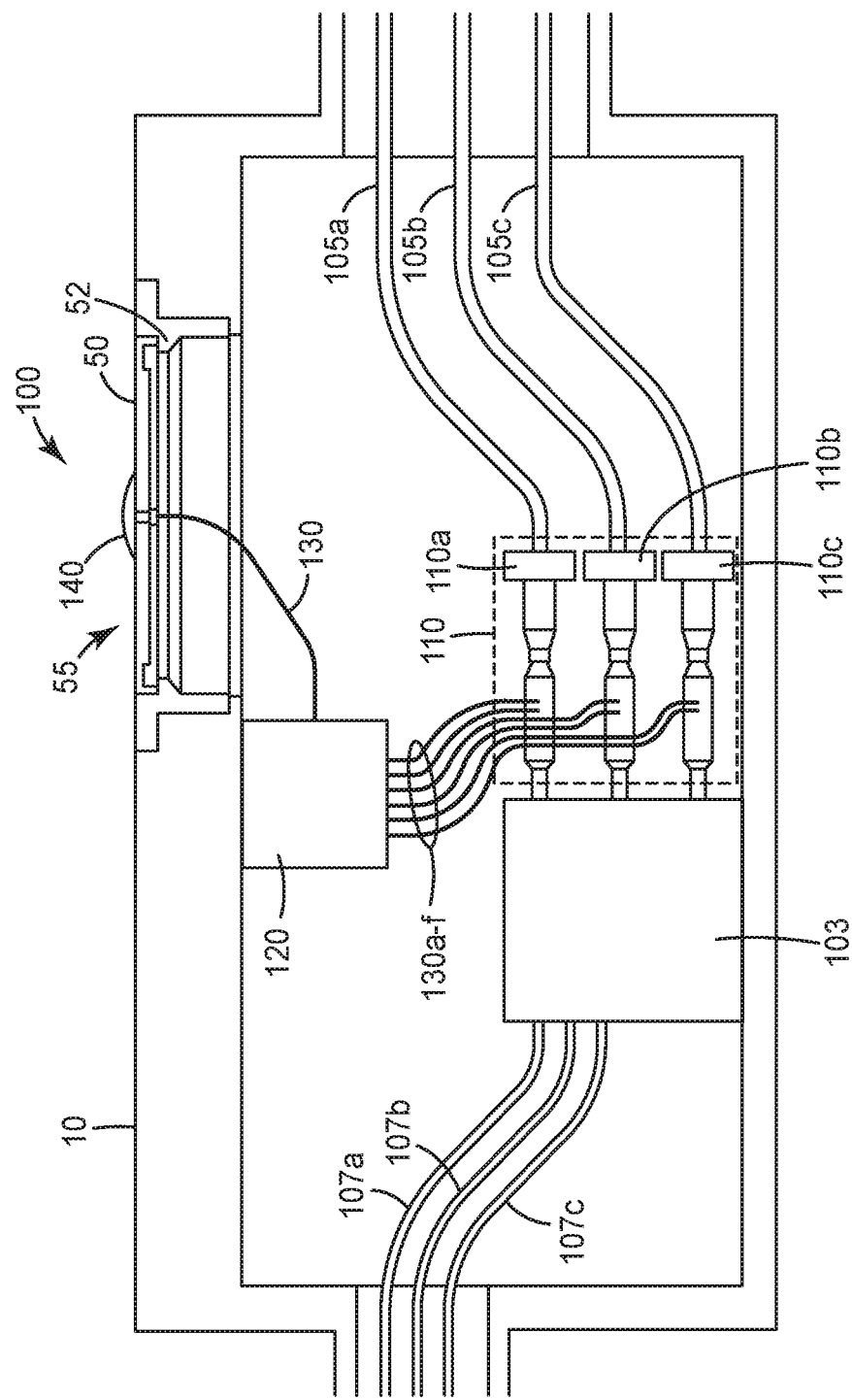
FIG. 1 is a schematic view of a data communication system according to a first aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

A data communication apparatus, system, and method are described herein that can be utilized in an enclosure, such as a grade level, above ground or underground enclosure. In one aspect, the enclosure is an underground enclosure accessible via an entrance port. The data communication system includes a transceiver disposed on an entrance port to an underground enclosure, such as a vault or manhole. The transceiver includes a rugged housing. In some aspects, at least a portion of the rugged housing extends above the surface of the entrance port. In other aspects, the rugged housing is attached to the entrance port such that a portion of the housing is substantially flush with the top surface of the entrance port and a substantial portion of the housing is disposed below the top surface of the entrance port. A monitoring device is disposed in the vault. The monitoring device can be a sensor that provides data related to a real-time condition within the vault. In addition, in some aspects, the data communication system can include a gateway unit that relays the data to the transceiver. In other aspects, a sensor analytics unit can process and analyze the real-time data from the monitoring device and relay that processed data to the transceiver. In a further aspect, the sensor and sensor analytics unit can be incorporated as part of a sensored electrical accessory.

In particular, in one aspect, the transceiver includes a physically robust antenna and radio. This antenna/transceiver can take a combination of wireless and/or wired signals from the monitoring device(s)/sensor(s) which provide real-time data regarding environmental, component, and other electronic equipment conditions for those components/equipment disposed within the underground enclosure. In addition, the communication system can communicate with other equipment and components disposed underground in other locations. In some aspects, the gateway unit relays the data payload from those monitoring devices/sensors and underground equipment to the transceiver which can communicate with above-ground network elements such as wireless access points, mobile radio cells, and private radios. In other aspects, the sensored analytics unit relays processed data corresponding to the data measured by the sensors to the transceiver. As such, in some aspects, sensors can be used to provide real time information about underground grid performance, and a cost effective means for communicating with those monitoring devices/sensors is by using wireless networks.

The transceiver can be disposed or embedded in a raised or flush-mounted structure. In another aspect, a matching pair of embedded raised structure antennas and/or electronics for above ground and below ground transmission respectively can be provided for an underground enclosure. In addition, multiple antennas (e.g., antennas transmitting/receiving WiFi, GPS, mobile radio, etc. signals) are provided in a single robust structure.

FIG. 1 shows one aspect of the present invention, a data communication system 100. In this aspect, the data communication system 100 is an underground data communication system. The communications system 100 is disposed in an exemplary underground enclosure, here underground vault 10. In this example implementation, vault 10 includes a variety of equipment, such as one or more high voltage electrical lines, such as electrical lines 105a-105c (carrying e.g., low, medium or high voltage power), associated components and/or accessories, such as a splice or termination (in the example of FIG. 1, a termination 110 will represent such associated components and/or accessories), a transformer, such as a step down transformer 103, and further electrical lines 107a-107c (carrying low voltage power (e.g., 440V) to a nearby building or structure). In some vaults, a transformer may not be included therein.

The enclosure or vault 10 can be accessed from above ground via a portal or entrance port 55 that includes a conventional manhole cover 50, which can be formed from a metal or non-metal, and can have a conventional circular shape. In a one aspect, the manhole cover 52 can be mounted on a ring, frame or flange structure 52 of the entrance port 55. In this aspect, vault 10 is can be constructed as a conventional underground vault, commonly used by electric, gas, water, and/or other utilities. However, in alternative aspects, the underground data communication system 100 can be utilized in another type of underground enclosure or similar structure, such as a manhole, basement, cellar, pit, shelter, pipe, or other underground enclosure.

The vault also includes at least one monitoring device disposed therein which can monitor a physical condition of the vault or of the components or equipment located in the vault. Such conditions would normally be difficult to gather or assess from above-ground. As described in detail below, the underground data communication system can provide a communication infrastructure to relay vault condition information to an above ground network or SCADA, without having a service technician physically enter the vault to determine those conditions.

In a further aspect, the underground communication system can be implemented in an above ground environment. For example, communications system 100 can be mounted within a grade level, pad mounted enclosure. The communications system can provide a means of wirelessly communicating to and from a structure that is constructed in a manner that would otherwise prevent direct wireless communications to and from the interior portion of the structure.

As shown in FIG. 1, in this example, termination 110 provides a terminal connection for a power cable, such as a low, medium or high voltage power cable 105a-105c. The monitoring device can be a sensor disposed on the termination. This sensor can provide sensing capabilities that measure a cable condition, such as voltage, current, and/or temperature. Thus, in this example, termination 110 can be referred to as a sensed termination 110 that can provide real-time data about the condition of one or more connected power lines.

For example, the sensed termination 110 of this aspect can include a Rogowski coil that produces a voltage that is proportional to the derivative of the current, meaning that an integrator can be utilized to revert back to a signal that is proportional to the current. Alternatively, a current sensor can be configured as a magnetic core current transformer that produces a current proportional to the current on the inner conductor. In addition, sensed termination 110 can include a capacitive voltage sensor that provides precise voltage measurements. Because sensed termination 110 can include both a current sensor and a capacitive voltage sensor, the sensed termination facilitates calculation of phase angle (power factor), Volt Amps (VA), Volt Amps reactive (VAr), and Watts (W). An exemplary sensed termination is described in U.S. Provisional Application No. 61/839,543, incorporated by reference herein in its entirety.

While the embodiment of FIG. 1 shows a monitoring device implemented as a sensed termination, in other aspects of the invention, the monitoring device can be implemented as part of a more general sensed electrical accessory, such as a cable termination, cable splice, or electrical jumper.

Thus, it is contemplated that the monitoring device can comprise one or more of the following sensors: power, voltage, current, temperature, combustible materials or byproducts of combustion, mechanical strain, mechanical movement (e.g. revolutions per minute), humidity, soil condition (acidity, moisture content, mineral content), pressure, hazardous atmosphere, liquid flow, leakage, component end-of-life or lifetime (e.g., a cathodic protection sensor), personnel presence (e.g., has someone entered the enclosure), physical state (e.g., is the enclosure open or closed, is the door open or closed, is a switch or valve open or closed, has an item been tampered with), light sensor, vibration (seismic, tampering).

In another aspect of the invention, data is communicated from the monitoring device inside the enclosure to a network or SCADA located outside the enclosure. This communication can be accomplished via a gateway unit and transceiver. As explained in further detail below, the gateway unit can be incorporated in a remote terminal unit, incorporated in a transceiver device mounted on the entrance portal, or it can be implemented as a stand-alone unit within the enclosure or at the enclosure entrance.

The gateway unit can connect underground to various monitoring devices using wired or wireless connections. The gateway unit can perform local analysis and interpretation of data from the monitoring devices. For example, the gateway unit can interpret monitoring device/sensor information to determine environmental conditions such as the presence of hazardous gases, moisture, dust, chemical composition, corrosion, pest presence, and more. In addition, the gateway unit can perform some local actions, such as the opening and closing of switches. Further, the gateway unit can send aggregated information such as periodic status or asynchronous alarm notifications upstream to another aggregation node or cloud server above ground. The gateway unit can also respond to messages sent to it by an upstream aggregation node or cloud (e.g., SCADA) service. Typical commands from an upstream node or cloud service can include "transmit status," "perform action," "set configuration parameter," "load software," etc.

As shown in FIG. 1, in this example, data from the sensed terminations 110a-110c can be communicated via one or more communication cables (here cables 130a-130f, with two cables connected to each sensed termination) to a remote terminal unit or RTU 120. The RTU 120 can be mounted at a central location within the vault 10, or along a wall or other internal vault structure. In this embodiment of the invention, RTU 120 can include a gateway unit (not separately shown). Alternatively, the gateway unit can be disposed within the transceiver 140 or configured as a stand-alone component. The gateway unit and transceiver are described in further detail below.

In one aspect, RTU 120 is adapted to process data signals received from sensed termination 110 and transform such data signals into signals useable in a supervisory control and data acquisition (SCADA) system. In addition, RTU 120 can also be adapted to receive signals from the SCADA system to control one or more components or equipment located in the vault. As shown in FIG. 1, data can be communicated between RTU 120 and a transceiver unit 140 (described below) via cable 130, which can comprise a conventional coaxial cable.

In another aspect of the invention, the RTU 120 can be implemented with a wireless network transmitter/receiver. Example wireless networks that can be used in an underground location include any combination of WiFi, ZigBee, ANT, Bluetooth, infrared, and others. Thus, RTU 120 can be configured to communicate wirelessly with transceiver 140 and/or the monitoring devices and/or equipment located in vault 10. This equipment can include sensed terminations or any of the other sensor types previously mentioned with added wireless communication capability.

The communication system 100 further includes a transceiver unit 140 that communicates information from (and to) the sensed termination 110/RTU 120 to (and from) the above ground SCADA or wireless communications network. Several different transceiver unit constructions 140a-140e are shown in FIGS. 2A-2E and are described in further detail below.

It is noted that in an alternative aspect of the invention, the underground data communication system can omit the RTU altogether. In this manner, the transceiver unit 140 can provide a gateway unit that will allow the underground equipment/monitoring devices to communicate with above ground communications networks. In several aspects, the transceiver unit 140 comprises an environmentally hardened above ground antenna which is coupled to a radio which communicates with widely available above-ground wireless communications networks such as WiFi, WiMax, mobile telephone (3G, 4G, LTE), private licensed bands, etc. The transceiver unit can also include a gateway unit comprising gateway electronics that provide an interface between above ground radio signals and communications to underground monitoring devices/equipment wirelessly via a second antenna or via direct connection to the gateway unit with copper and/or fiber cabling. The gateway unit performs network connection, security, and data translation functions between the above ground and underground networks.

As mentioned above, in one aspect, a single gateway unit can communicate with one or more of the multiple underground monitoring devices/equipment implemented within vault 10. As described above, the monitoring devices can comprise stand alone sensors or sensors integrated with equipment and components disposed in the vault, such as the sensor portion(s) of sensored terminations 110, and other vault sensors, such as moisture sensors, air quality sensors, pressure sensors, etc.

Figure 2A:
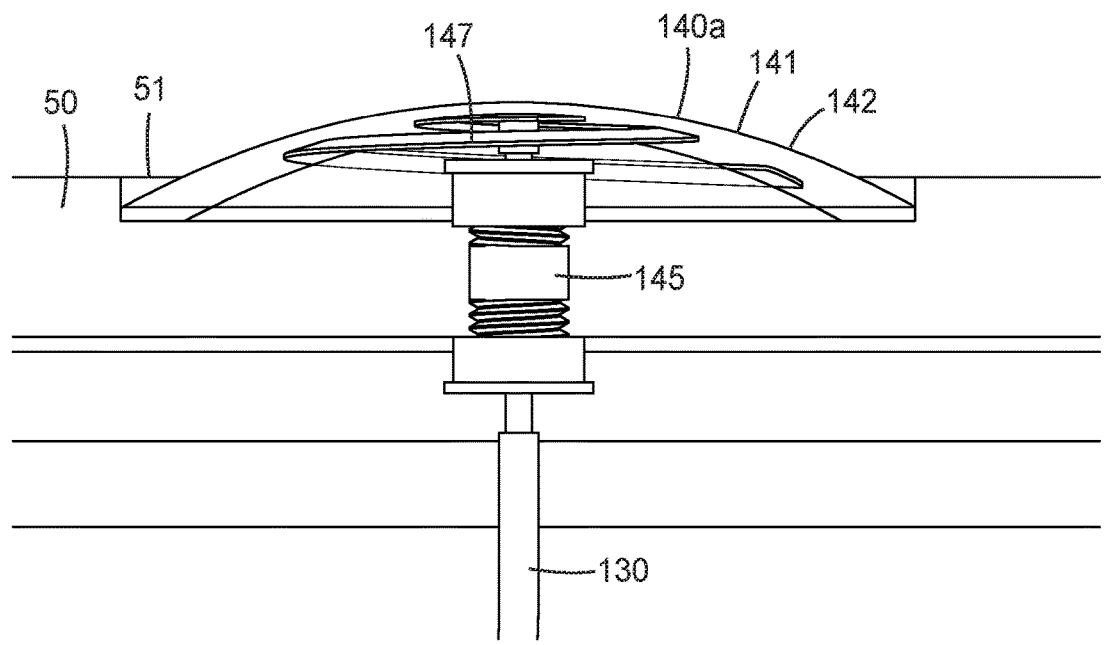
FIGS. 2A-2E are side views of alternative transceiver mountings and constructions according to other aspects of the invention.

FIGS. 2A-2E show several different constructions for transceiver unit 140. For example, FIG. 2A shows a transceiver unit 140a having a housing 141 that includes a main body portion 142. An antenna portion 147 and a radio portion (which can include radio electronics, not shown) can be disposed in main body portion 142. In this configuration, transceiver unit 140a is mounted to manhole cover 50 that allows entrance into vault 10 from above the ground. In this aspect, manhole cover 50 can include a recessed portion 51 configured to support at least a base portion of the transceiver unit 140a. In one aspect, besides the radio and antenna components, the transceiver unit 140a may further include processors, data storage units, communications interfaces, power supplies, and human interface devices.

The housing 141 can be a sealed structure and may include one or more housing parts such as a cover and base plate. At least some of the housing parts may be made of a moldable plastic material. The material of the housing parts may be resistant against aggressive substances. The housing can be sealed to protect the radio, antenna, and other components contained within it. By using a seal of appropriate material, such as a graphite-containing material, a seal may additionally be provided against aggressive substances like gasoline or oil which may be present in an outside environment.

In an alternative aspect, housing 141 can be constructed as a radio frequency transparent pavement marker made of high impact resistant resin that can be molded, machined, or cast. An example alternative construction is described in U.S. Pat. No. 6,551,014, incorporated by reference herein in its entirety. In this alternative aspect, the reflectivity of the marker can be modified to visually indicate a state of the equipment in the vault. For example, a blinking or non-blinking light can indicates normal/abnormal status. Further, a slowly blinking marker light can indicate caution, and/or a fast blinking light can indicate a dangerous condition. In this example, a liquid crystal filter can be mounted in front of the reflector, and the LC polarity can be modulated with a microprocessor. Alternatively, the internal light source, e.g., and LED, can be directly modulated.

The electric or electronic components contained within the housing 141 can be active, passive, or both active and passive. Thus, the transceiver housing 141 makes it possible to mount an antenna on the outside surface of an underground vault or enclosure while allowing the radio/antenna to be electrically connected to, e.g., an RTU 120, located in the vault. For example, an antenna connection or conduit 145 can couple cable 130 to the transceiver unit 140a. In this aspect, cable 130 can be a conventional coaxial cable. The conduit 145 can have a screw-on construction and can screw into an appropriately-sized hole tapped into the manhole cover 50. In addition, the type of antenna design utilized can take into account the construction and materials used to form manhole cover 50. In a preferred aspect, manhole cover 50 comprises a standard, conventional manhole cover, as existing covers of various sizes and composition can be easily modified to fit the transceiver/antenna.

Figure 2B:
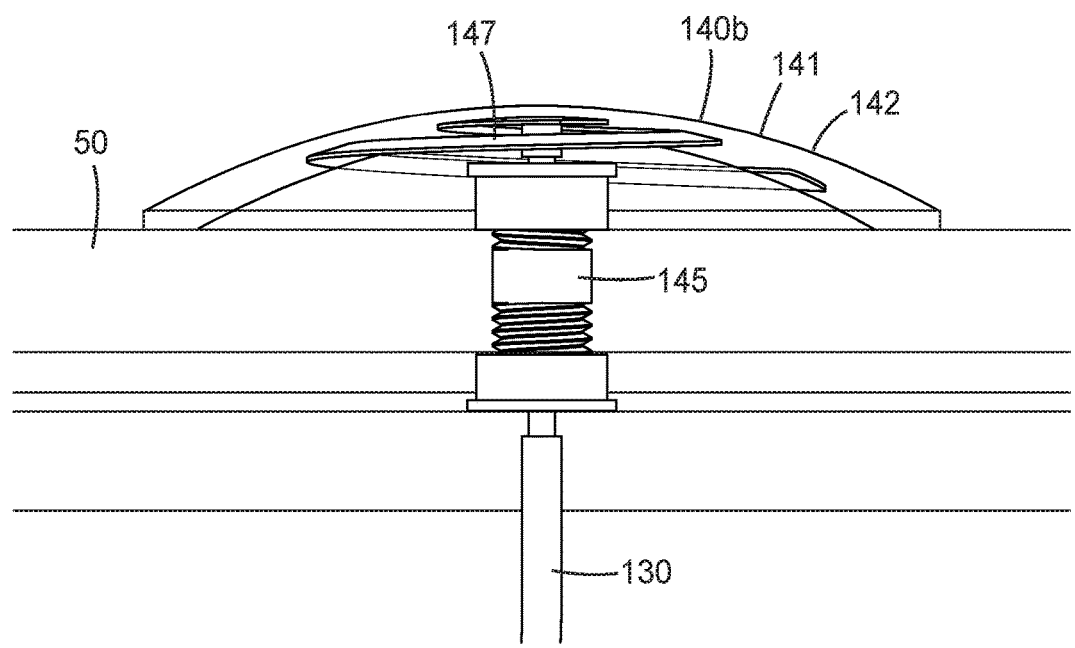

Thus, with this construction, if a monitoring device, such as a sensor portion of a sensored termination, senses a line fault, transceiver unit 140a can communicate real-time fault location information to a power utility network or SCADA system. FIG. 2B shows an alternative aspect of the invention, a transceiver unit 140b having a housing 141 that includes a main body portion 142, where an antenna portion 147 and a radio portion can be disposed in main body portion 142. In this particular configuration, transceiver unit 140b is substantially flush-mounted to manhole cover 50 and includes a robust, thick housing. For example, the housing can comprise a polycarbonate material with a polyurethane core, with a ribbed area that provides flexibility to keep the polycarbonate material from cracking.

An antenna connection or conduit 145 can couple cable 130 to the transceiver unit 140b. The interior components and operation of transceiver 140b can be the same as described above with respect to transceiver 140a.

Figure 2C:
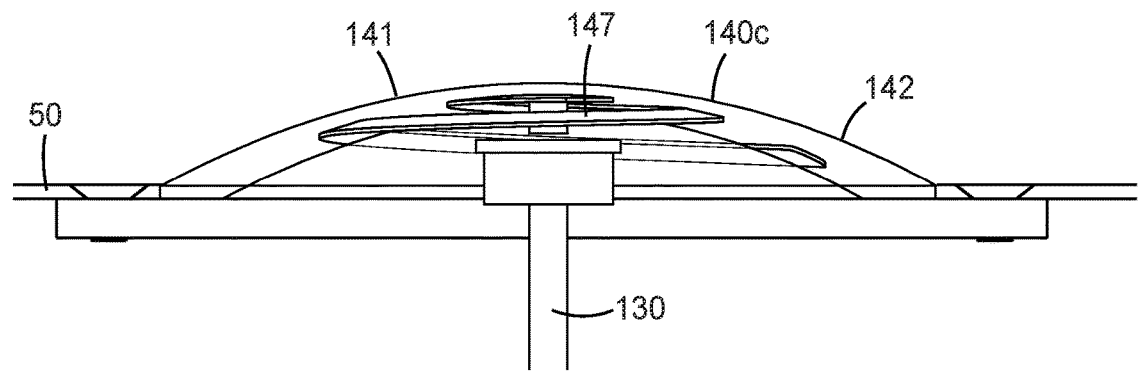

FIG. 2C shows another alternative aspect of the invention, a transceiver unit 140c having a housing 141 that includes a main body portion 142, where an antenna portion 147 and a radio portion, along with accompanying electronics, can be disposed in main body portion 142. In this particular configuration, transceiver unit 140b is recessed-mounted to a thin manhole cover 50a and secured thereto via conventional bolts. An antenna connection or conduit 145 can couple cable 130 to the transceiver unit 140c. The interior components and operation of transceiver 140b can be the same as described above with respect to transceiver 140a.

Figure 2D:
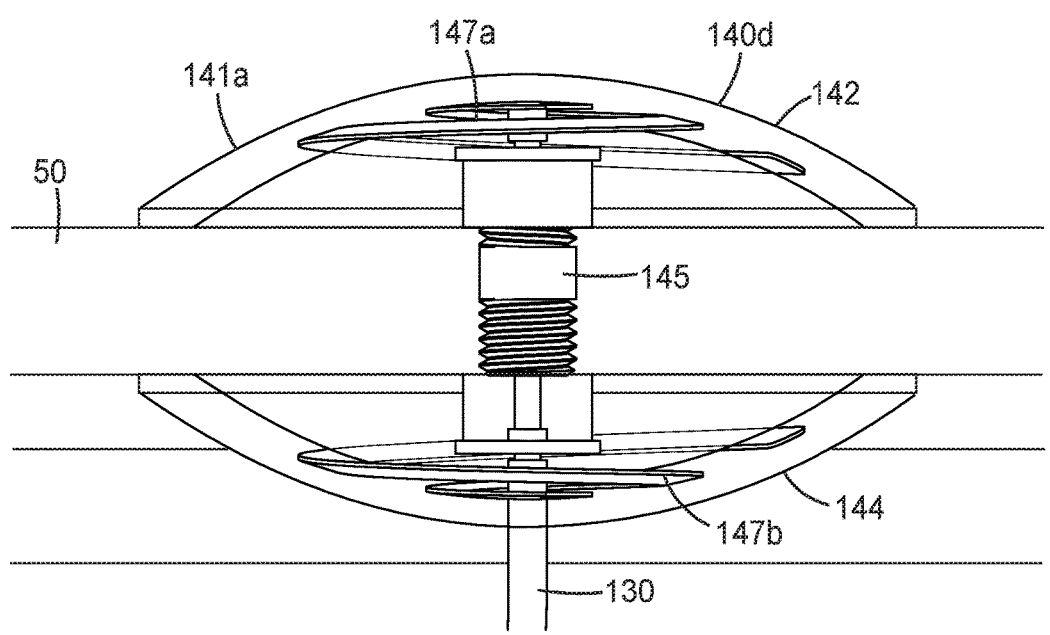

FIG. 2D shows yet another alternative aspect of the invention, a transceiver unit 140d having a dual housing 141a, 141b that includes an upper body portion 142 and a lower body portion 144, where the upper body portion 142 houses a first antenna portion 147a and a radio portion, and the lower body portion 144 houses a second antenna portion 147b and a radio portion. The first antenna portion 147a can be configured to communicate with above-ground wireless networks and the second antenna portion 147b can be configured to communicate with a below-ground network via cable 130. In this particular configuration, upper body portion 142 is flush-mounted to first side of manhole cover 50 and lower body portion 144 is flush-mounted to a second side of manhole cover 50. This particular design allows for straightforward installation to an existing manhole cover by drilling a single hole and utilizing a screw-on type conduit 145 that can be screwed into the appropriately-sized hole tapped into the manhole cover 50. The housing 141a and be formed from a robust, thick housing material. The lower housing 141b can be formed from the same or a different material.

Figure 2E:
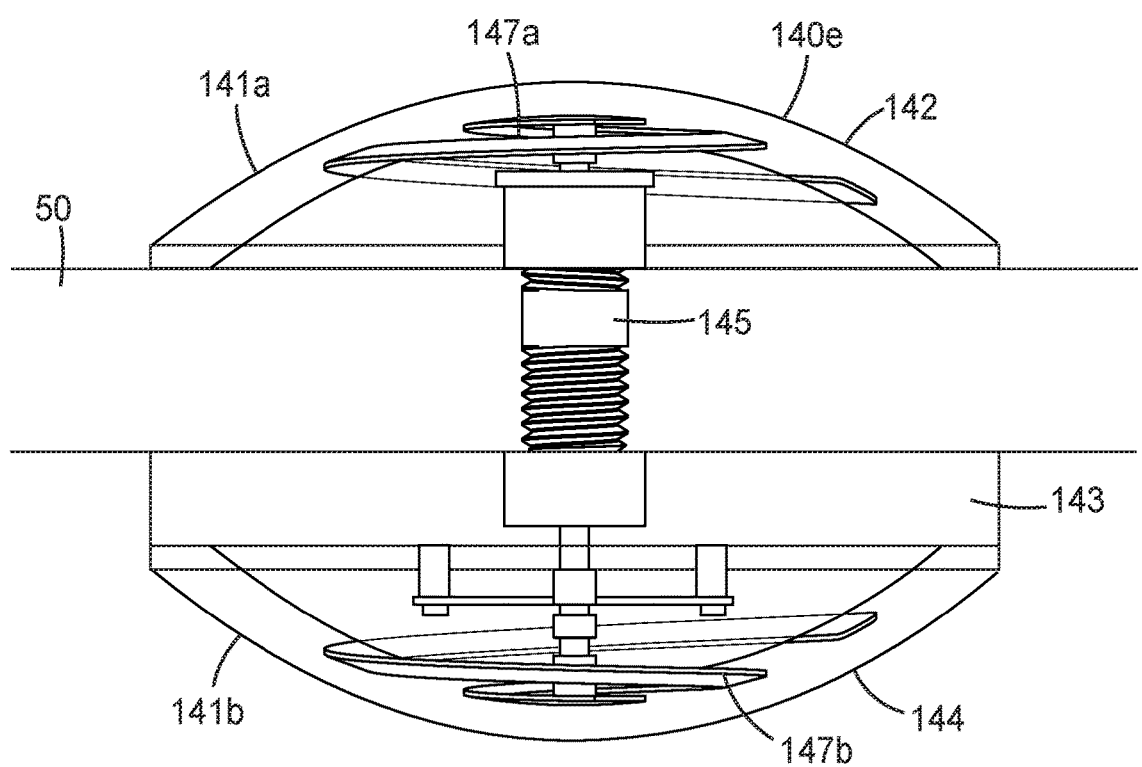

FIG. 2E shows yet another alternative aspect of the invention, a transceiver unit 140e having a dual housing 141a, 141b that includes an upper body portion 142 and a lower body portion 144, where the upper body portion 142 houses a first antenna portion 147a and a radio portion, and the lower body portion 144 houses a second antenna portion 147b and a radio portion. In addition, transceiver unit 140e further includes a gateway unit 143 that transforms the data from a first protocol (e.g., Zigbee, used below ground) to a second protocol e.g., 4G, used above ground). As such, the first antenna portion 147a can be configured to communicate with above-ground wireless networks and the second antenna portion 147b can be configured to communicate with a below-ground wireless network, which may be different from the above-ground wireless network. In this particular configuration, upper body portion 142 is flush-mounted to first side of manhole cover 50. The gateway unit 143, which can comprise a separate structure or can be contained within housing 141b, and lower body portion 144 can be flush-mounted to a second side of manhole cover 50. The gateway unit receives data from the monitoring device and can comprise appropriate circuits and or electronics to read the data, analyze the data, aggregate the data, classify the data, infer vault conditions based on the data, and take action based on the data. In addition, the gateway unit 143 can provide a clock source for event correlation.

Again, this particular design allows for straightforward installation to an existing manhole cover by drilling a single hole and utilizing a screw-on type conduit 145 that can be screwed into the appropriately-sized hole tapped into the manhole cover 50. The housing 141a and be formed from a robust, thick housing material. The lower housing 141b can be formed from the same or a different material.

In one aspect, an example structure that can be utilized to house at least some of the components of the transceiver and/or gateway unit is described in U.S. Pat. No. 8,135,352, incorporated by reference herein in its entirety.

In another aspect, multiple antennas can be embedded in the same housing (or housing portion) allowing for multiple communications methods both above and below ground. For example, WiFi and 4G antennas can be embedded in the same above ground antenna housing along with a GPS antenna to provide multiple network connections along with GPS positioning and timing information. A Bluetooth antenna can be embedded in the above ground housing to provide local communications to personnel in close proximity to the transceiver/gateway unit. For example, a craft person driving over a transceiver/gateway unit could directly read the sensors in the vault below using Bluetooth. An RFID antenna can be embedded in the above ground housing to permit reading underground sensor data with an RFID reader.

In another aspect, power can be provided to the components of the underground data communication system 100 through various means. In one aspect, equipment may be run via AC or DC power sources already located in the vault 10. If there is no available AC or DC power source, in another aspect, a power harvesting coil can be installed on electrical equipment, such as termination 110 that can provide power to the components in the vault 10. Alternatively, piezoelectric transducers can be utilized to convert the mechanical vibration found within vault 10 to electrical energy that can be stored in batteries or super capacitors. For example, a conventional piezoelectric transducer is available from Mide (www.mide.com). In another aspect, thermoelectric transducers can be utilized to convert the natural temperature differential between above ground and below ground to electrical energy. For example, see (http://www.idtechex.com/research/reports/thermoelectric-energy-harvesting-2012-2022-devices-applications-opportunities-000317.asp). In a further aspect, solar panels can be employed for trickle powering the battery or other internal components.

Figure 3:
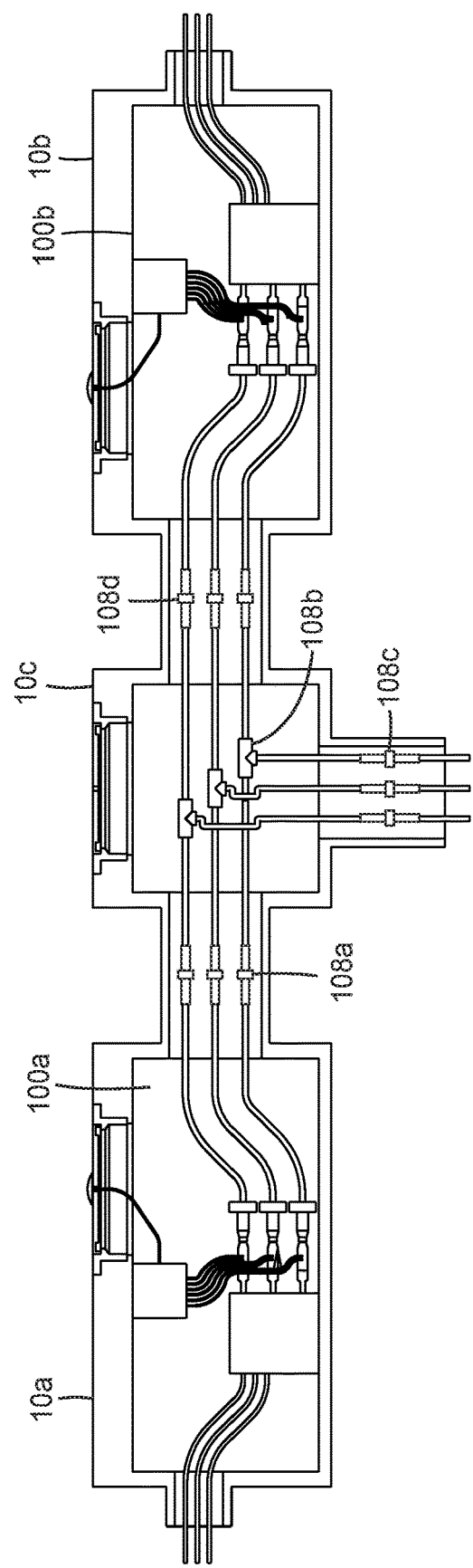
FIG. 3 is a schematic view of a data communication system according to another aspect of the invention.

In another aspect of the invention, multiple underground data communication systems can be configured to communicate with monitoring devices and/or equipment located within the underground utility infrastructure outside of a particular vault location. For example, FIG. 3 shows a wireless underground manhole utility infrastructure having a first vault 10a and a second vault 10b interposing a splice enclosure 10c that provides low/medium/high voltage lines to the vaults. Vault 10a can be implemented with a first underground data communication system 100a (configured in a manner similar to those implementations described above) and vault 10b can be implemented with a second underground data communication system 100b (also configured in a manner similar to those implementations described above). In one example, first underground data communication system 100a is implemented with a Zigbee network. At a desired interval, the RTU or gateway unit of first underground data communication system 100a can monitor a condition of splice 108a, which is located outside of vault 10a, between vault 10a and enclosure 10c. In addition, the RTU or gateway unit of first underground data communication system 100a can monitor a condition of components 108b and/or splices 108c, which are located at or near enclosure 10c. In a similar manner, second underground data communication system 100b can also be implemented with a Zigbee network and can monitor a condition of splice 108d, which is located outside of vault 10b, between vault 10b and enclosure 10c.

In addition, multiple underground data communication systems can be configured to communicate with each other as well as with an above ground network, such as a utility SCADA system. For example, first underground data communication system 100a can communicate directly with second underground data communication system 100b, in addition to communicating with the above-ground network.

Figure 4:
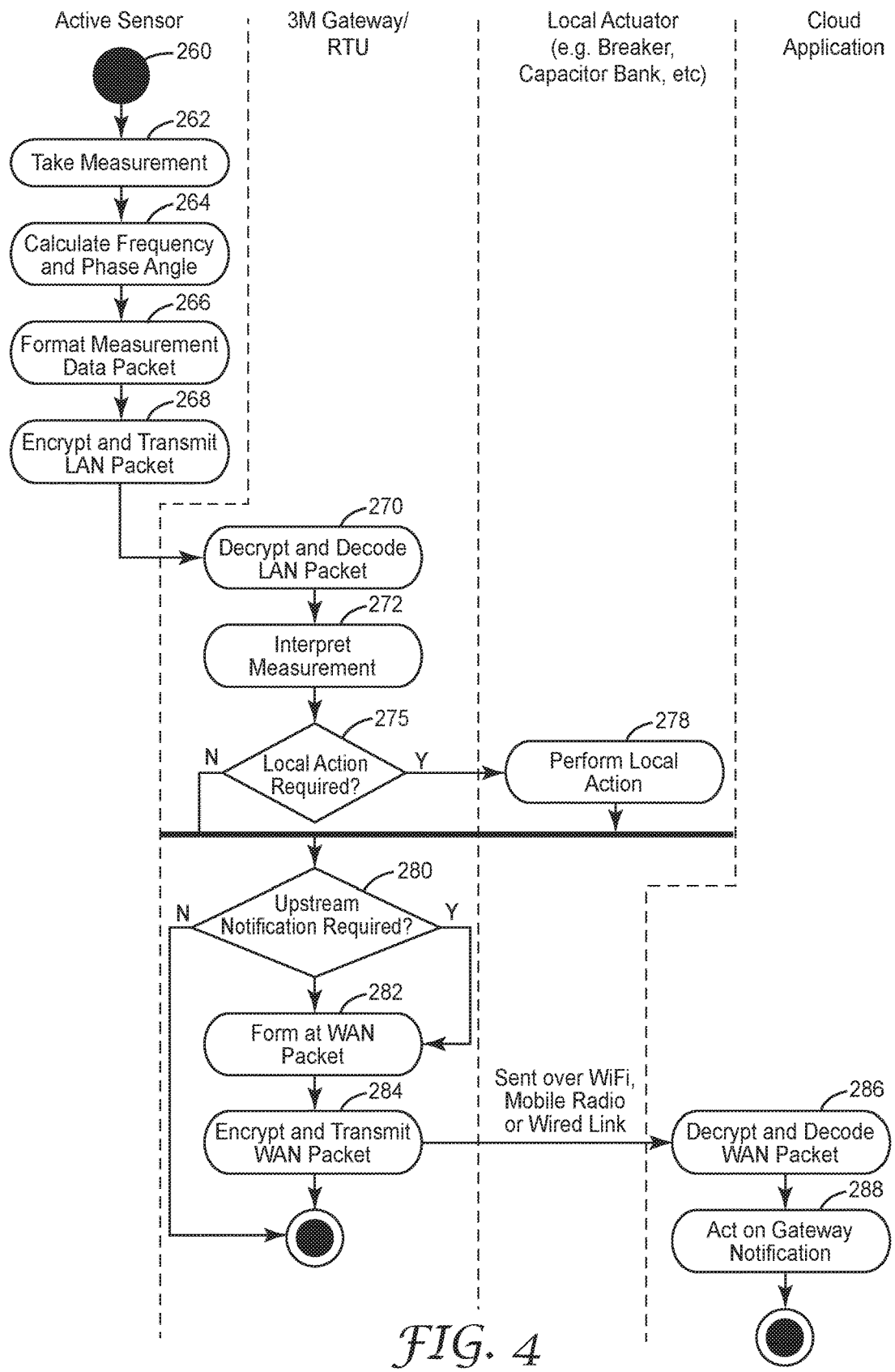
FIG. 4 is a flowchart of an example process for generating and communicating a data signal from an underground vault according to another aspect of the invention.

In further detail, FIG. 4 provides an example flowchart illustrating some of the functions of the underground data communication system. As mentioned above, the gateway unit can be a stand-alone unit, it can be incorporated with an RTU or it can be incorporated as part of the transceiver.

In this embodiment, the gateway unit is co-located with the transceiver. A monitoring device, in this example an active sensor 260, which can be configured as a current and voltage sensor of an exemplary sensored termination (such as described previously), takes a measurement (step 262) of real time condition of an electrical line. For example, an analog signal corresponding to the real time condition can be digitized. In this example, the measurement can be communicated to an RTU (either wirelessly or via wire) or it can be processed by the active sensor itself, depending on the type of sensor utilized. Assuming the data is sent to an RTU, the RTU processes the measured signal by calculating the frequency and phase angle (step 264). The measured data is formatted into a measurement data packet (step 266). The data packet is then encrypted and transmitted as a local area network (LAN) packet (step 268). In this example, the LAN is a Zigbee LAN and the RTU includes a Zigbee radio. Alternatively, if an RTU is not utilized, the signal processing can be performed by the monitoring device, which can then communicate the data directly to the gateway or nearest Zigbee radio.

In step 270, the LAN packet is decrypted and decoded by the gateway unit. In step 272, the decoded data is interpreted by the gateway unit. For example, the gateway unit can be uploaded with a library of key faults to provide classification of a particular fault or assignment of a severity level based on preset or downloaded conditions or combinations of existing conditions. Based on the interpretation, the gateway unit determines whether to take a local action (step 275). If a local action is necessary, the gateway communicates a signal to equipment to take action in step 278 (e.g., trip a circuit breaker, turn on/off capacitor bank, etc.).

In addition, the gateway can also determine whether an upstream notification is required in step 280. If yes, the gateway unit can format a wide area network (WAN) packet (step 282) and encrypt and transmit the WAN packet (step 284). The WAN packet can be sent out over WiFi, local radio, etc., as described above. A WAN receiver (e.g., a mobile receiver unit, such as a service technician having a communication device loaded with the appropriate App, or the operations center of the service provider) can receive the WAN data packet, decrypt and decode the WAN packet (step 286). The entity receiving the WAN data packet (e.g., operations center or service vehicle) can then act on the notification from the gateway unit.

In one aspect, this type of communication system allows a utility company to accurately pinpoint an underground fault location, thus saving the time and expense of entering and physically inspecting a multitude of vault locations within the grid. In addition, performing the appropriate local actions can quickly restore service to customers and prevent further damage to the grid itself.

Figure 5:
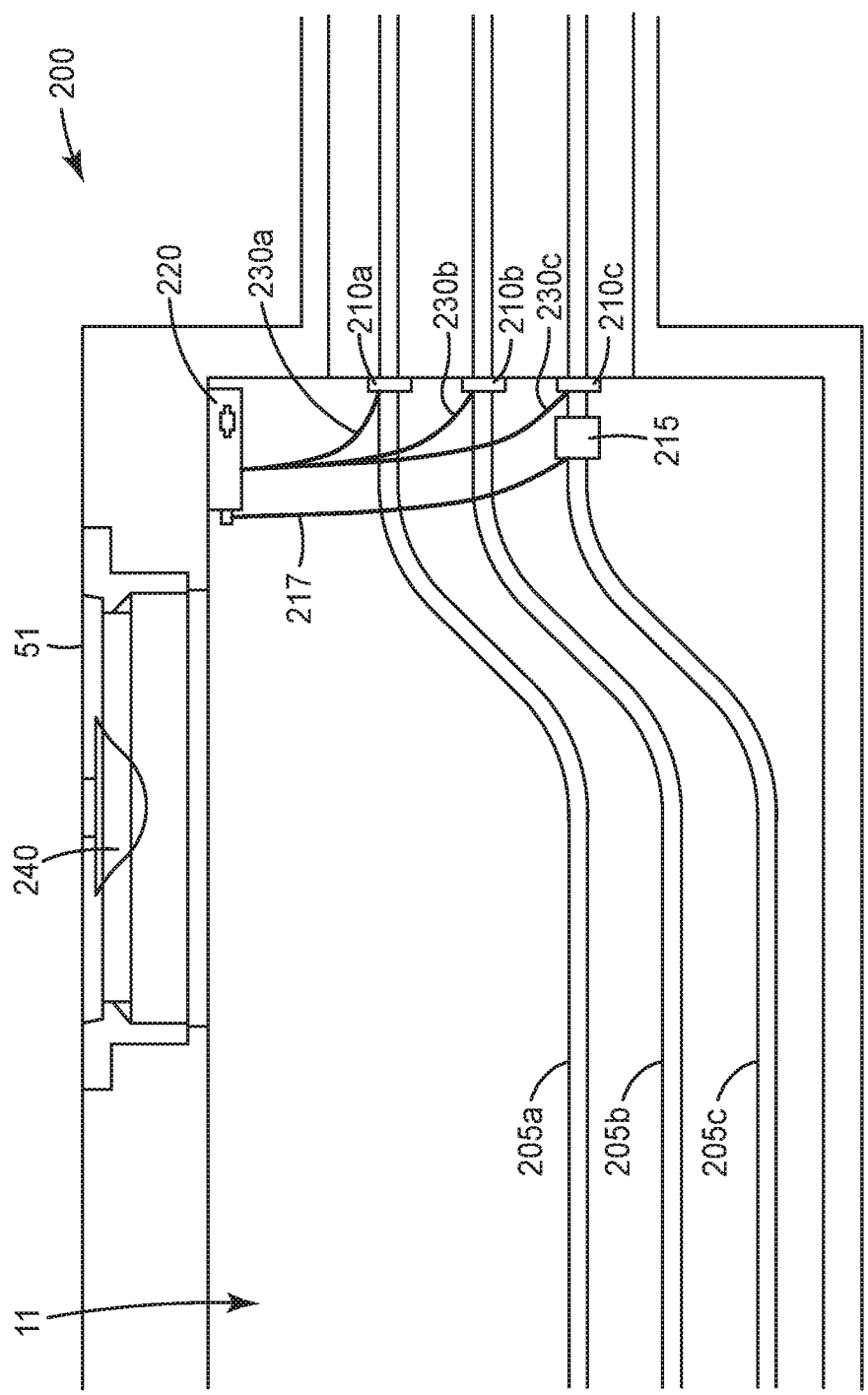
FIG. 5 is a schematic view of a data communication system according to another aspect of the invention.

FIG. 5 shows another aspect of the invention, an underground data communication system 200. The communications system 200 is disposed in an exemplary underground enclosure, here underground vault 11. In this example implementation, vault 11 includes one or more electrical lines, such as electrical lines 205a-205c (carrying e.g., low, medium or high voltage power).

Similar to that discussed above, in an alternative aspect, the underground communication system 200 could be implemented in an above ground environment.

Referring back to FIG. 5, the enclosure or vault 11 can be accessed from above ground via a portal, such as a conventional or modified manhole cover 51, which can be formed from a metal or non-metal, and can have a conventional circular shape. In this aspect, vault 11 is can be constructed as a conventional underground vault, commonly used by electric, gas, water, and/or other utilities. However, in alternative aspects, the underground data communication system 200 can be utilized in another type of underground enclosure or similar structure, such as a manhole, basement, cellar, pit, shelter, pipe, or other underground enclosure.

The vault also includes at least one monitoring device disposed therein which can monitor a physical condition of the vault or of the components or equipment located in the vault. For example, in this aspect, a current sensor (210a-210c), such as a Rogowski coil, that produces a voltage that is proportional to the derivative of the current, is provided on each electrical line 205a-205c. Alternatively, other sensor devices, such as those described above, can be utilized within enclosure 11.

The raw data signals can be carried from the sensors via signal lines 230a-230c to a sensored analytics unit (SAU) 220. The SAU 220 can be mounted at a central location within the vault 11, or along a wall or other internal vault structure. The SAU 220 includes a digital signal processor (DSP) or system on a chip (SOC) to receive, manipulate, analyze, process, or otherwise transform such data signals into signals useable in a supervisory control and data acquisition (SCADA) system. In addition, the DSP can perform some operations independently of the SCADA. For example, the DSP can perform fault detection, isolation, location and condition monitoring and reporting. Moreover, the DSP/SAU can be programmed to provide additional features, such as Volt, VAR optimization, phasor measurement (synchrophaser), incipient fault detection, load characterization, post mortem event analysis, signature waveform identification and event capture, self-healing and optimization, energy auditing, partial discharge, harmonics/sub-harmonics analysis, flicker analysis and leakage current analysis.

In addition, the DSP and other chips utilized in the SAU require can be configured to require only low power levels, on the order of less than 10 W. In this aspect, SAU 220 can be provided power via a power harvesting coil 215 that can be coupled to one of the electrical lines to provide sufficient power to the SAU via power cable 217.

In addition, the SAU 220 can be implemented with a backup battery (not shown). Further, the SAU 220 can include additional sensors to monitor, e.g., environmental conditions within the enclosure.

The processed data from the SAU 220 can be communicated to a network or SCADA via a transceiver 240. As shown in FIG. 5, the transceiver 240 is configured as an environmentally robust communication gateway. In this aspect, transceiver 240 can include fully integrated very low power electronics (an SOC for detecting time synchronous events), along with GPS and versatile radio communication modules. The transceiver 240 can be powered by a battery source or wireless power (such as a wireless power transmitter, not shown). The transceiver 240 can be mounted/designed in a modular way as to have the flexibility to install various additional sensors in a variety of packages for different applications.

As shown in FIG. 5, the transceiver can be mounted directly onto entrance cover 51. In this aspect, a portion of the transceiver 240 is configured to extend through a hole or conduit formed in the entrance cover 51. In addition, the top portion of the transceiver 240 is designed to be substantially flush with a top surface of entrance cover 51. In this manner, the risk of damage to the transceiver from outside elements is reduced.

The transceiver 240 can communicate with internal enclosure components, such as the SAU 220, via a short range communication protocol (e.g., bluetooth, WiFi, ZigBee, ANT). In this manner, the transceiver unit 240 can provide a gateway that allows the underground equipment/monitoring devices (e.g., SAU 220) to communicate to and from above ground communications networks. In this aspect, the transceiver unit 240 also comprises an environmentally hardened above ground antenna, such as described above. The above ground antenna can be housed in the portion of the transceiver 240 that is substantially flush or that extends above (see e.g., FIG. 1) the top surface of the entrance cover and which is coupled to a radio which communicates with widely available above-ground wireless communications networks such as WiFi, WiMax, mobile telephone (3G, 4G, LTE, GSM), private licensed bands, non-licensed bands, etc. The transceiver 240 can also include gateway electronics that provide an interface between above ground radio signals and communications to the SAU 220 wirelessly via a second antenna. Alternatively, the SAU 220 can communicate to the transceiver 240 via direct connection with copper and/or fiber cabling (similar to cable 130 shown in FIG. 1, but not shown in FIG. 5). The transceiver performs network connection, security, and data translation functions between the above ground and underground networks. In other aspects, the gateway electronics can be provided within the SAU, which can format data packages to an appropriate network format and send the formatted signals to a transmitting antenna of the transceiver via a standard signal cable.

In this aspect, transceiver 240 includes a large, primary battery that is rated for at least 12-15 years. In this aspect, communications system 200 can be configured to conserve the power used by the transceiver 240 by operating on a periodic basis. For example, in addition to a, e.g., once-a-day status check, the SAU 220 can be programmed to only send signals to the transceiver 240 when key, problematic events occur.

In an alternative aspect, transceiver 240 can be powered by an external power source, such as power available from power harvesting device 215, or another power harvesting device coupled to another electrical line.

In a further alternative aspect, the underground enclosure can further include a wireless power transmitter mounted near the transceiver 240. The wireless power transmitter can wirelessly transmit power to the transceiver (via inductive coupling, such as near-field inductive coupling). For example, the wireless power transmitter can include a first (primary) inductor that couples with a second inductor located in the transceiver 240. The wireless power transmitter can be brought into close proximity to the transceiver 240 via a hinged support arm mounted within the underground enclosure. In one aspect, the wireless transmitter can be placed into an operational position where the distance to the transceiver 240 can be closer than about ⅓ wavelength of the carrier frequency used. Antenna positioning within the wireless power transmitter and transceiver can be further optimized depending on the conditions. The wireless power transmitter can itself be powered by a power harvesting device, such as device 215.

Figure 6:
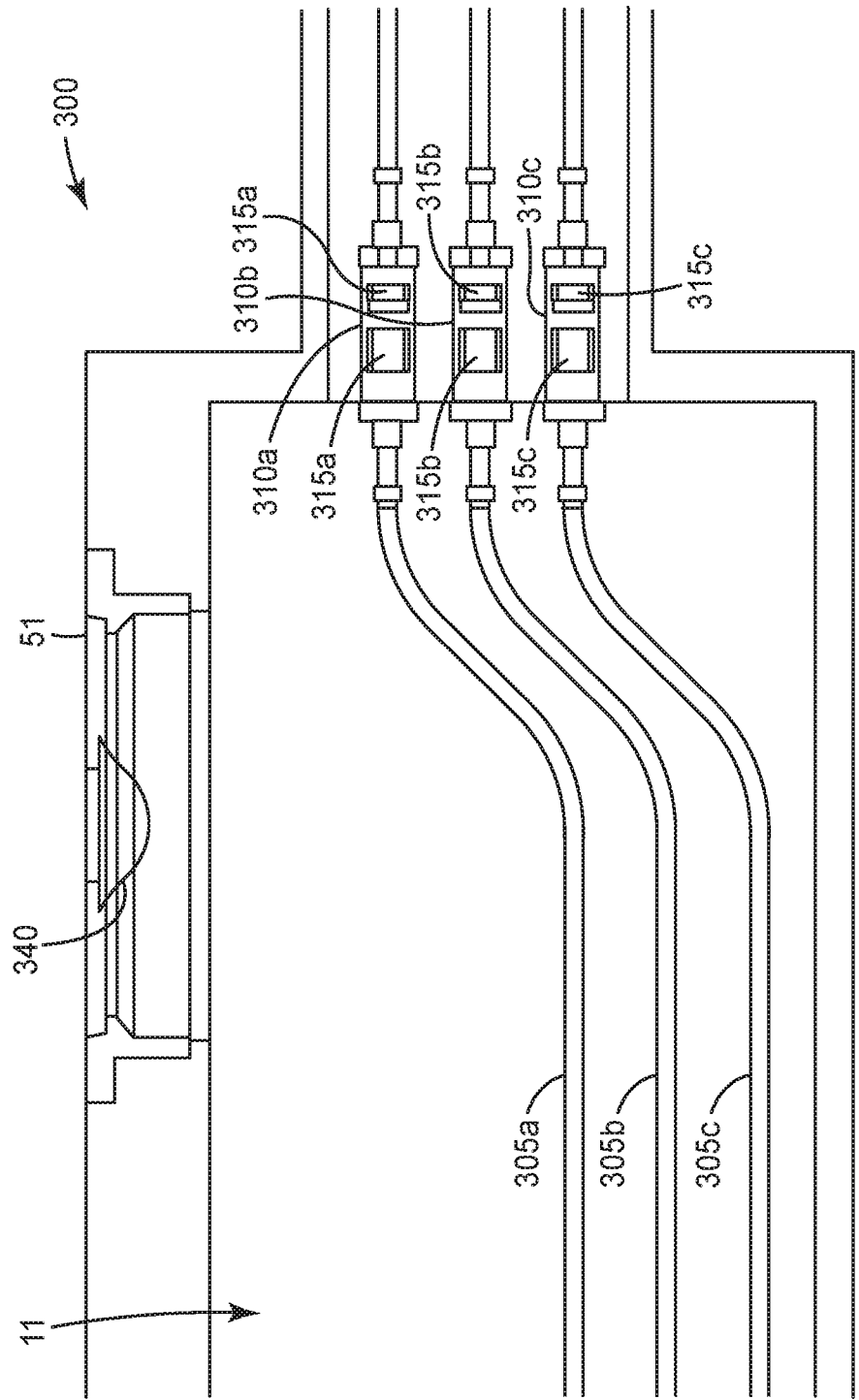
FIG. 6 is a schematic view of a data communication system according to another aspect of the invention.

FIG. 6 shows another aspect of the invention, communication system 300. The communications system 300 is disposed in an exemplary underground enclosure, here underground vault 11. In this example implementation, vault 11 includes one or more high voltage electrical lines, such as electrical lines 305a-305c (carrying e.g., medium to high voltage power).

The enclosure or vault 11 can be accessed from above ground via a portal, such as a conventional or modified manhole cover 51, which can be formed from a metal or non-metal, and can have a conventional circular shape. In this aspect, vault 11 is can be constructed as a conventional underground vault, commonly used by electric, gas, water, and/or other utilities. However, in alternative aspects, the underground data communication system 300 can be utilized in another type of underground enclosure or similar structure, such as a manhole, basement, cellar, pit, shelter, pipe, or other underground enclosure.

The vault also includes at least one monitoring device disposed therein which can monitor a physical condition of the vault or of the components or equipment located in the vault.

In this aspect, the monitoring device and SAU are fully integrated within a sensed cable accessory. The sensed cable accessory, in this instance, sensed cable splices 310a-310c, further includes the system analytics 311a-311c (including a DSP chip and a system communications (e.g., a Bluetooth) chip) fully integrated as part of the sensed cable accessory.

In one aspect, the DSP chip, a system communications chip, and other chips, such as A/D converters and timing chips, as needed, can be mounted on a flexible circuit or a small printed circuit board (e.g., FR4) that is coupled to an isolated electrode element that extends around the insulating layer of the power carrying conductor of the cable splice. In this manner, a separate SAU is not required for system 300, as the integrated sensed cable accessory can receive, manipulate, analyze, process, or otherwise transform raw sensor data signals into signals useable in a supervisory control and data acquisition (SCADA) system.

In addition, a power harvesting device (e.g., devices 315a-315c) can be integrated as part of the sensed cable splices 310a-310c to provide sufficient power for the DSP/Bluetooth chipset. The power harvesting device utilized in this aspect of the invention can be constructed in a manner similar to, for example, the energy harvesting devices described in EP Patent Application No. EP 14169529.6, incorporated by reference in its entirety. In this example construction, an energy harvesting device can be used to power a co-located sensing device as part of a sensed cable accessory.

The processed data from the sensed cable accessory 310a-310c can be communicated to a network or SCADA via a transceiver 340. As shown in FIG. 6, the transceiver 340 is configured as an environmentally robust communication gateway. In this aspect, transceiver 340 can include fully integrated very low power electronics (an SoC for detecting time synchronous events), along with GPS and versatile radio communication modules. The transceiver 340 can be powered by a battery source such as described above. As shown in FIG. 6, the transceiver 340 is mounted directly onto entrance cover 51. In addition, the top portion of the transceiver 340 is designed to be substantially flush with a top surface of entrance cover 51. In this manner, the risk of damage to the transceiver from outside elements is reduced.

The transceiver 340 can wirelessly communicate with internal enclosure components, such as the sensed cable accessory 310a-310c, via a short range communication protocol (e.g., Bluetooth). In this aspect, the transceiver unit 340 also comprises an environmentally hardened above ground antenna, such as described above. The above ground antenna can be housed in the portion of the transceiver 340 that is substantially flush or that extends above (see e.g., FIG. 1) the top surface of the entrance cover 51 and which is coupled to a radio which communicates with widely available above-ground wireless communications networks such as WiFi, WiMax, mobile telephone (3G, 4G, LTE), private licensed bands, etc. The transceiver 340 can also include gateway electronics that provide an interface between above ground radio signals and communications to the sensed cable accessory wirelessly via a second antenna.

In an alternative aspect, transceiver 340 can be further integrated with one or more sensors, such as an environmental (e.g., gas, smoke, temperature, etc.) sensor. Transceiver 340 can also include a DSP chip, a system communications chip, and other chips, such as A/D converters and timing chips, as needed, to communicate between the environmental sensor and a network or SCADA.

In addition, multiple underground data communication systems can be configured to communicate with each other as well as with an above ground network, such as a utility SCADA system. For example, first underground data communication system 100a can communicate directly with second underground data communication system 100b, in addition to communicating with the above-ground network.

Figure 7:
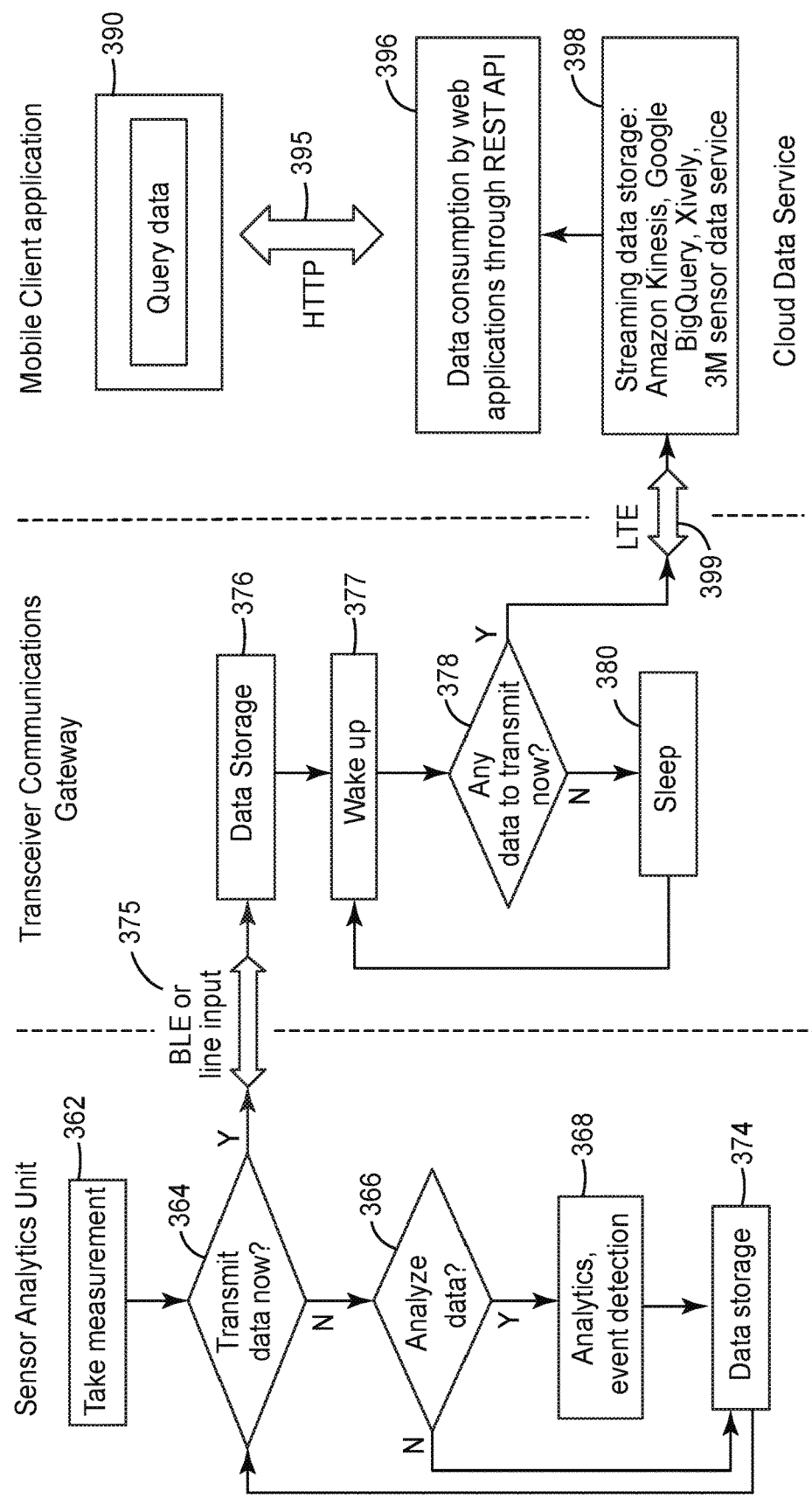
FIG. 7 is a flowchart of an example process flow for a data communication system according to another aspect of the invention.

In further detail, FIG. 7 provides another example communications flowchart illustrating an example communication scheme.

Similar to the embodiment of system 200 (shown in FIG. 5), the communications gateway unit is co-located with the transceiver 240. In other aspects, the communications gateway unit can be co-located with the SAU.

In the example of FIG. 7, a sensor measurement can be communicated to an SAU (either wirelessly or via wire) or it can be processed by the active sensor itself, depending on the type of sensor utilized. Assuming the data is sent to an SAU, the SAU processes the measured signal by performing one or more modes of analysis. In this example, the SAU 220 can record a measurement (step 362) of a real time condition of an electrical line, in this example from a monitoring device, such as sensor 310*a*. The SAU 220 determines whether to transmit formatted data (step 364) to the transceiver/gateway unit. If no, in step 366, the SAU determines if it should analyze the data. If the data is not analyzed, it is sent to data storage (step 374). If the data is to be analyzed, analytics and/or event detection can be performed (step 368) by the SAU. Based on the analysis, the SAU can direct certain action, such as a control action, and/or the data is stored in memory (step 374).

If data is to be communicated outside of the enclosure, formatted/measured/analyzed data is communicated to the transceiver/gateway unit (either wirelessly or through a communications line) in step 375. In this aspect, the transceiver 240 is typically kept in sleep mode (step 380) and will be signaled to wake up (step 377) upon receiving a data signal from the SAU that is stored in data storage (step 376). Otherwise, in this aspect, the transceiver/gateway unit wakes up at a predetermined time.

A decision is made (either at the SAU or the transceiver/gateway unit) to transmit data in step 378. If data is not sent, the transceiver/gateway unit can be placed back in sleep mode (step 380). A data package is formatted by the gateway unit and is transmitted from the transceiver via a standard or private telecommunications protocol (step 399) to a cloud data service or SCADA (step 398). The entity receiving the data (e.g., operations center or service vehicle) can then act on the notification from the transceiver/gateway unit. For example, a WAN receiver (e.g., a mobile receiver unit, such as a service technician having a communication device loaded with the appropriate App, or the operations center of the service provider) can receive the packeted data from the transceiver, query, decrypt and/or decode the information (in step 390). This information can be communicated via the internet or network communications (step 395) from/to the cloud data service or SCADA (398), with data consumption by web applications (step 396). For example, in step 396, a representational state transfer can take place, thereby creating, reading, updating, and/or deleting information on a server.

In one aspect, this type of communication system allows a utility company to accurately pinpoint an underground fault location, thus saving the time and expense of entering and physically inspecting a multitude of vault locations within the grid. In addition, performing the appropriate local actions can quickly restore service to customers and prevent further damage to the grid itself. Further, this communication system allows a utility to communicate directly to a particular enclosure, transceiver, and/or SAU to reconfigure or update system settings, tables, thresholds for power and environmental sensing.

Similar to that discussed above, in an alternative aspect, the underground communication system 300 could be implemented in an above ground environment, such as where low, medium, or high voltage cables enter from the underground and are exposed in the grade level equipment. For example, the sensored cable splices and transceiver could be implemented in an above-ground transformer enclosure. For example, grade-level or above ground devices that can utilize one or more of these communication systems include, e.g., power or distribution transformers, motors, switch gear, capacitor banks, and generators. In addition, one or more of these communication systems can be implemented in self-monitoring applications such as bridges, overpasses, vehicle and sign monitoring, subways, dams, tunnels, and buildings. The monitoring devices themselves, or as combined with an SAU can be implanted in systems requiring very low power computational capabilities driven by event occurrence, identification, location, and action taken via a self powered unit. Further, the integration of GPS capabilities along with time synch events leads to finding key problems with early detection with set thresholds and algorithms for a variety of incipient applications/faults/degradation of key structural or utility components. Another variable is the non-destructive mechanical construction which would have the ability to be utilized in fairly hazardous applications.

Figure 8:
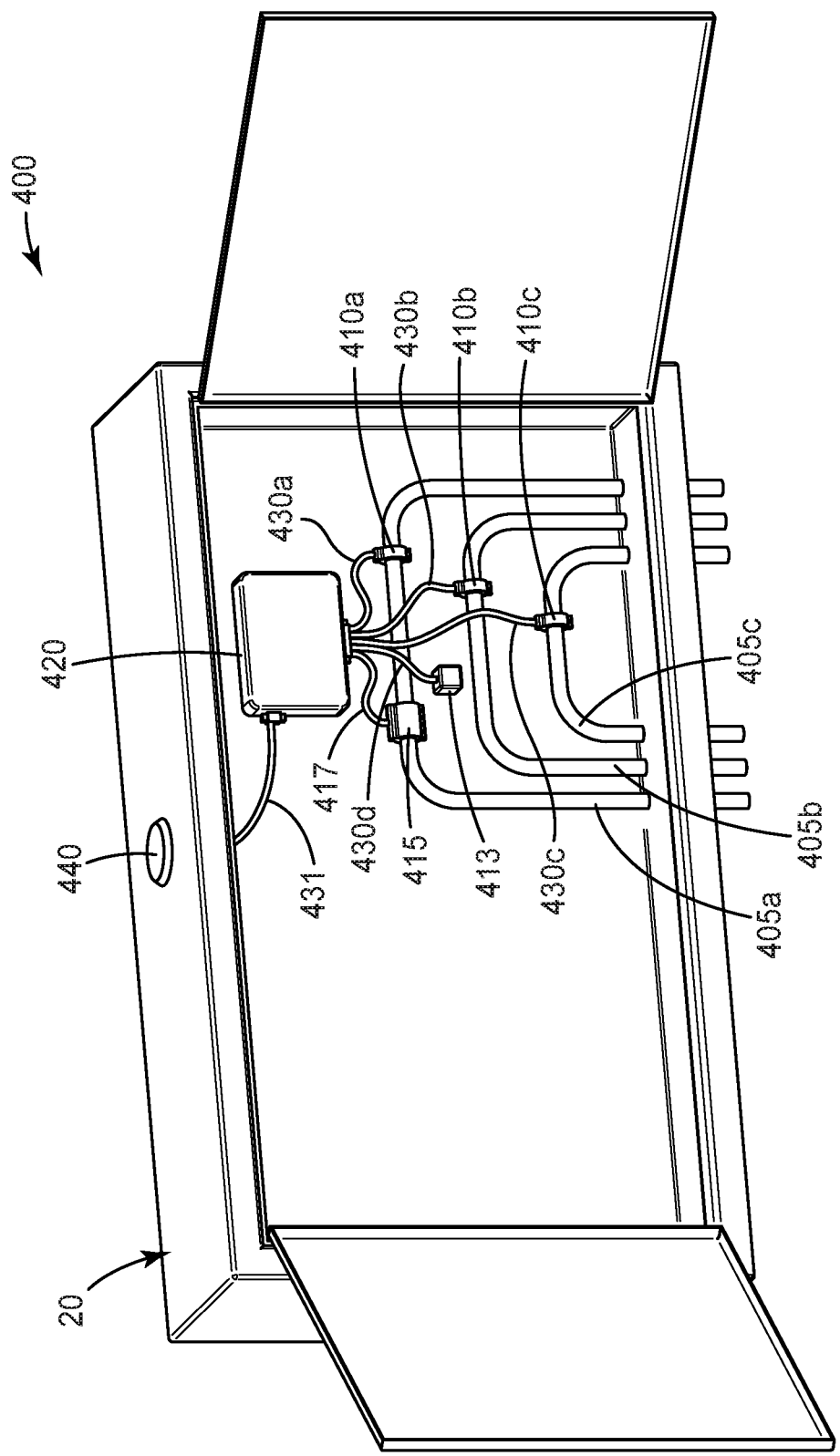
FIG. 8 is a schematic view of a pad-mounted data communication system according to another aspect of the invention.

For example, FIG. 8 shows an example enclosure 20 that can be implemented at grade or above-ground that includes a communications system 400. In this example implementation, enclosure 20 includes one or more electrical lines, such as electrical lines 405*a*-405*c* (carrying e.g., low, medium, or high voltage power). In alternative aspects, the enclosure 20 could house a capacitor bank, motor, switch gear, power or distribution transformer, a generator, and/or other utility equipment.

The enclosure 20 also includes at least one monitoring device disposed therein which can monitor a physical condition of the vault or of the components or equipment located in the vault. For example, in this aspect, a current sensor (410*a*-410*c*), such as a Rogowski coil, that produces a voltage that is proportional to the derivative of the current, is provided on each electrical line 405*a*-405*c*. Additionally, an environmental sensor 413 can also be included. Other sensor devices, such as those described above, can also be utilized within enclosure 20.

The raw data signals can be carried from the sensors via signal lines 430*a*-430*c* to a sensored analytics unit (SAU) 420. The SAU 420 can be mounted at a central location within the enclosure 20, or along a wall or other internal structure. The SAU 420 includes a digital signal processor (DSP) or system on a chip (SOC) to receive, manipulate, analyze, process, or otherwise transform such data signals into signals useable in a supervisory control and data acquisition (SCADA) system. In addition, the DSP can perform some operations independently of the SCADA. For example, the DSP can perform fault detection, isolation, location and condition monitoring and reporting. Moreover, the DSP/SAU can be programmed to provide additional features, such as Volt, VAR optimization, phasor measurement (synchnophaser), incipient fault detection, load characterization, post mortem event analysis, signature waveform identification and event capture, self-healing and optimization, energy auditing, partial discharge, harmonics/sub-harmonics analysis, flicker analysis and leakage current analysis.

In addition, the DSP and other chips utilized in the SAU require can be configured to require only low power levels, on the order of less than 10 W. In this aspect, SAU 420 can be provided power via a power harvesting coil 415 that can be coupled to one of the electrical lines to provide sufficient power to the SAU via power cable 417. In addition, the SAU 420 can be implemented with a backup battery (not shown).

The processed data from the SAU 420 can be communicated to a network or SCADA via a transceiver 440. In this aspect, transceiver 440 can include fully integrated very low power electronics (an SOC for detecting time synchronous events), along with GPS and versatile radio communication modules. The transceiver 440 can be powered by a line power source within the enclosure 20, a battery source or wireless power (such as a wireless power transmitter, not shown) The SAU 420 can communicate to the transceiver 440 via direct connection with a copper and/or fiber cabling 431.

In this aspect, the transceiver 440 can be mounted directly onto the top (or other) surface of the enclosure 20. The transceiver 440 can communicate with internal enclosure components, such as the SAU 420, via cables 430a-430c. The transceiver 420 can perform network connection, security, and data translation functions between the outside and internal networks, if necessary.

In another aspect, SAU 420 can be configured as a modular or upgradeable unit. Such a modular unit can allow for dongle or separate module attachment via one or more interface ports. As shown in FIG. 8, multiple sensors (410a-410c, 413) are connected to SAU 420. Such a configuration can allow for the monitoring of power lines and/or a variety of additional environmental sensors, similar to sensor 413, which can detect parameters such as gas, water, vibration, temperature, oxygen-levels, etc.). For example, in one alternative aspect, sensor 413 can comprise a thermal imaging camera to observe a temperature profile of the environment and components within the enclosure. The aforementioned DSP/other chips can provide computational capabilities to interpret, filter, activate, configure, and/or communicate to the transceiver 440. Dongle or connector blocks can house additional circuitry to create an analog to digital front end. The dongle or connector blocks can also include a plug-n-play electrical circuit for automatically identifying and recognizing the inserted sensing module (and automatically set up proper synchronization, timing, and other appropriate communication conditions).

Figure 9:
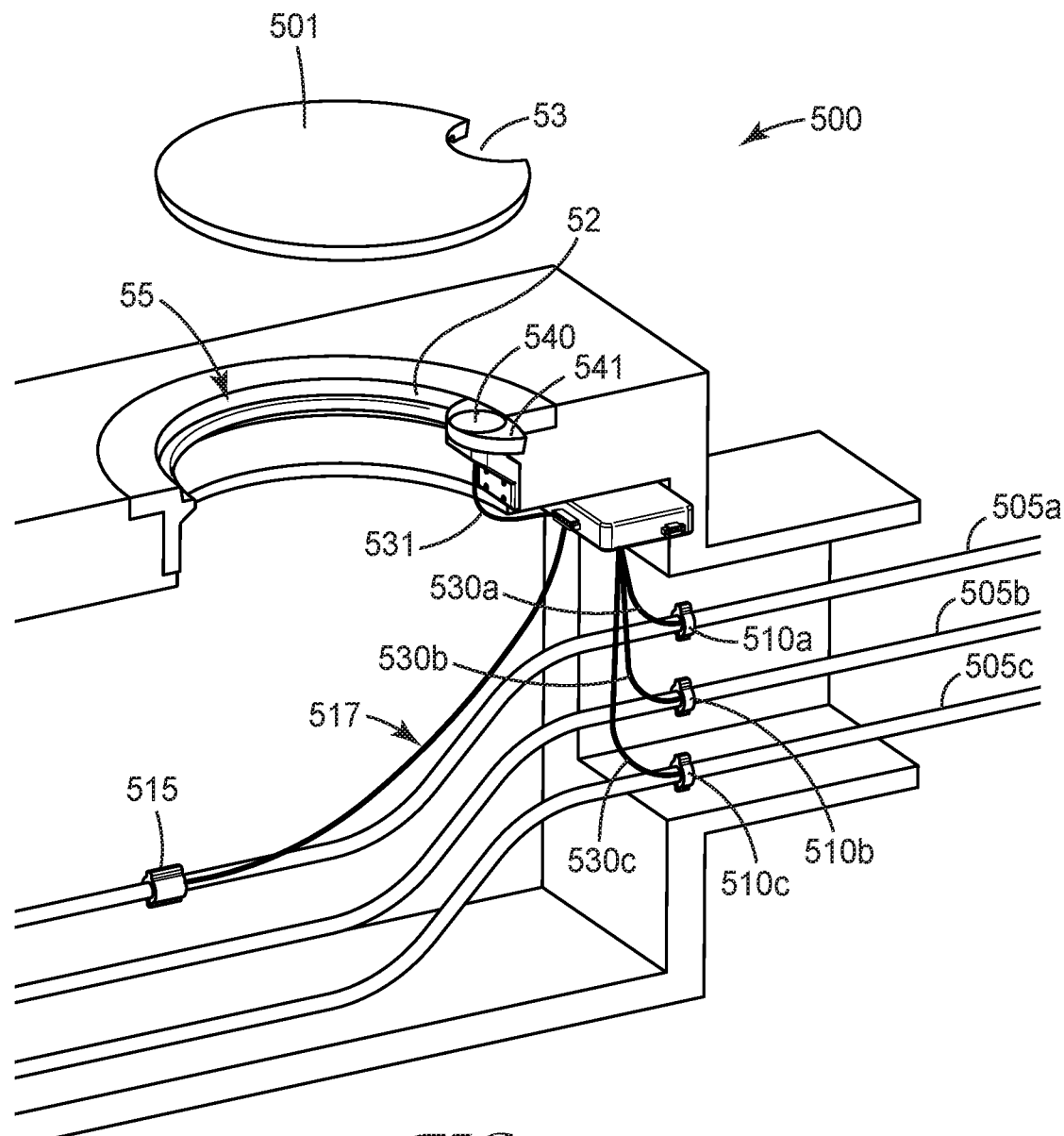
FIG. 9 is a schematic view of an underground data communication system according to another aspect of the invention.

FIG. 9 shows another aspect of the invention, an underground data communication system 500. The communications system 500 is disposed in an exemplary underground enclosure, here underground vault 11. In this example implementation, vault 11 includes one or more electrical lines, such as electrical lines 505a-505c (carrying e.g., low, medium or high voltage power).

The enclosure or vault 11 can be accessed from above ground via an entrance port 55, which includes a modified manhole cover 50' and a ring or flange 52. In this aspect, vault 11 is can be constructed as a conventional underground vault, commonly used by electric, gas, water, and/or other utilities. However, in alternative aspects, the underground data communication system 500 can be utilized in another type of underground enclosure or similar structure, such as a manhole, basement, cellar, pit, shelter, pipe, or other underground enclosure.

The vault also includes at least one monitoring device disposed therein which can monitor a physical condition of the vault or of the components or equipment located in the vault. For example, in this aspect, a current sensor (510a-510c), such as a Rogowski coil, that produces a voltage that is proportional to the derivative of the current, is provided on each electrical line 505a-505c. Alternatively, other sensor devices, such as those described above, can be utilized within enclosure 11.

The raw data signals can be carried from the sensors via signal lines 530a-530c to a sensored analytics unit (SAU) 520. The SAU 520 can be mounted at a central location within the vault 11, or along a wall or other internal vault structure. As shown in FIG. 9, the SAU can be mounted on a top wall of the vault 11. The SAU 520 includes a digital signal processor (DSP) or system on a chip (SOC) to receive, manipulate, analyze, process, or otherwise transform such data signals into signals useable in a supervisory control and data acquisition (SCADA) system. In addition, the DSP can perform some operations independently of the SCADA. For example, the DSP can perform fault detection, isolation, location and condition monitoring and reporting. Moreover, the DSP/SAU can be programmed to provide additional features, such as Volt, VAR optimization, phasor measurement (synchnophaser), incipient fault detection, load characterization, post mortem event analysis, signature waveform identification and event capture, self-healing and optimization, energy auditing, partial discharge, harmonics/sub-harmonics analysis, flicker analysis and leakage current analysis.

In addition, the DSP and other chips utilized in the SAU require can be configured to require only low power levels, on the order of less than 10 W. In this aspect, SAU 520 can be provided power via a power harvesting coil 515 that can be coupled to one of the electrical lines to provide sufficient power to the SAU via power cable 517.

In addition, the SAU 520 can be implemented with a backup battery (not shown). Further, the SAU 520 can include additional sensors to monitor, e.g., environmental conditions within the enclosure.

The processed data from the SAU 520 can be communicated to a network or SCADA via a transceiver 540. In this aspect, transceiver 540 can include fully integrated very low power electronics (an SOC for detecting time synchronous events), along with GPS and versatile radio communication modules. The transceiver 540 can be powered by a battery source or wireless power (such as a wireless power transmitter, not shown). The SAU 520 can communicate to the transceiver 540 via direct connection with a copper and/or fiber cabling 531. Alternatively, The transceiver 540 can also include gateway electronics that provide an interface between above ground radio signals and communications to the SAU 520 wirelessly via a second antenna.

In this aspect, the transceiver 540 can be mounted directly onto the ring or flange portion 52 of the entrance port 55. In this aspect, a bracket or mounting structure 541 can be configured to mount to the ring or flange 52 and secure the transceiver 540 therein. The entrance cover 50' can include a cut-out portion 53 along its perimeter that conforms to the outer shape of the transceiver/bracket structure. In this manner, the top portion of the transceiver 540 is designed to be substantially flush with a top surface of entrance cover 50'. Accordingly, the risk of damage to the transceiver 540 from outside elements is reduced. In addition, the risk of damage to the transceiver 540 or disconnection of cable 531 is reduced in the event that the entrance cover 50' is not removed properly.

The transceiver 540 can communicate with internal enclosure components, such as the SAU 520, via cables 530a-530c and/or via short range communication protocol (e.g., bluetooth, WiFi, ZigBee, ANT). In this manner, the transceiver unit 540 can provide a gateway that allows the underground equipment/monitoring devices (e.g., SAU 520) to communicate to and from above ground communications networks. In this aspect, the transceiver unit 540 also comprises an environmentally hardened above ground antenna, such as described above. The above ground antenna can be housed in the portion of the transceiver 540 that is substantially flush with the top surface of the entrance cover and which is coupled to a radio which communicates with widely available above-ground wireless communications networks such as WiFi, WiMax, mobile telephone (3G, 4G, LTE, GSM), private licensed band, non-licensed bands, etc. The transceiver performs network connection, security, and data translation functions between the above ground and underground networks. In other aspects, the gateway electronics can be provided within the SAU, which can format data packages to an appropriate network format and send the formatted signals to a transmitting antenna of the transceiver via a standard signal cable.

The present invention has now been described with reference to several individual embodiments. The foregoing detailed description has been given for clarity of understanding only. No unnecessary limitations are to be understood or taken from it. All references to right, left, front, rear, up and down as well as references to directions are exemplary only and do not limit the claimed invention. It will be apparent to those persons skilled in the art that many changes can be made in the embodiments described without departing from the scope of the invention. Thus, the scope of the present invention should not be limited to the details and structures described herein, but rather by the structures described by the language of the claims, and the equivalents of those structures.

The invention claimed is:

1. A data communication system, comprising:
   a transceiver including active electronics, an antenna, and Global Positioning System (GPS) circuitry, disposed on an entrance port to an enclosure, the transceiver including a housing, the housing mountable to the entrance port, wherein the transceiver is configured to communicate with a network outside of the enclosure;
   a monitoring device disposed in the enclosure that provides data related to a real-time condition within the enclosure; and
   a sensor analytics unit to process the data from the monitoring device and generate a processed data signal and to communicate the processed data signal to the transceiver, wherein the sensor analytics unit is configured to load software received from at least one of an upstream node and a cloud service.

2. The data communication system of claim 1, wherein the monitoring device comprises a sensor.

3. The data communication system of claim 2, wherein the sensor detects at least one of: power, voltage, current, temperature, combustible materials or byproducts of combustion, mechanical strain, mechanical movement, humidity, soil condition, pressure, hazardous atmosphere, liquid flow, leakage, component end-of-life or lifetime, personnel presence, physical state, light level, and vibration.

4. The data communication system of claim 1, wherein the transceiver includes a communications gateway unit.

5. The data communication system of claim 1, wherein the sensor analytics unit includes a digital signal processor.

6. The data communication system of claim 1, wherein the sensor analytics unit includes a wireless network communications chip.

7. The data communication system of claim 1, wherein the transceiver unit includes a hardened above ground antenna and radio.

8. The data communication system of claim 1, wherein the transceiver is configured to send aggregated information upstream to another aggregation node or cloud server above ground.

9. The data communication system of claim 1, wherein the transceiver is configured to respond to messages sent to it by an upstream aggregation node or cloud.

10. The data communication system of claim 1, wherein the enclosure comprises an underground enclosure and wherein the entrance port comprises a metal manhole cover and a ring portion to receive the metal manhole cover.

11. The data communication system of claim 10, wherein the transceiver is secured to the metal manhole cover and a portion of the transceiver housing extends through a hole formed in the entrance cover.

12. The data communication system of claim 11, wherein the transceiver housing portion extending through the hole formed in the entrance cover is substantially flush with a top surface of the entrance cover.

13. The data communication system of claim 10, wherein the transceiver is secured to a ring portion of the entrance port.

14. The data communication system of claim 1, further comprising a power harvesting device coupled to at least one power line located in the enclosure.

15. The data communication system of claim 1, wherein the sensor analytics unit contains a plurality of interface ports configured to connect to one or more environmental sensors.

16. A data communication system, comprising:
   a transceiver including active electronics, an antenna, and Global Positioning System (GPS) circuitry, disposed on a portion of an enclosure containing utility equipment, the transceiver including a housing, the housing mountable to the enclosure, wherein the transceiver is configured to communicate with a cloud data service or network outside of the enclosure;
   a monitoring device disposed in the enclosure that provides data related to a real-time condition within the enclosure; and
   a sensor analytics unit to process the data from the monitoring device and generate a processed data signal and to communicate the processed data signal to the transceiver, wherein the sensor analytics unit is programmed to provide at least one of incipient fault detection and partial discharge analysis.

17. The data communication system of claim 16, wherein the enclosure comprises an underground vault having a metal entrance port cover.

18. The data communication system of claim 16, wherein the enclosure comprises a grade level or above-ground enclosure.

19. A data communication system, comprising:
   a transceiver including active electronics, an antenna, and Global Positioning System (GPS) circuitry, disposed on a portion of an enclosure containing utility equipment, the transceiver including a housing, the housing mountable to the enclosure, wherein the transceiver is configured to communicate with a cloud data service or network outside of the enclosure;
   a monitoring device disposed in the enclosure that provides data related to a real-time condition within the enclosure; and
   a sensor analytics unit to process the data from the monitoring device and generate a processed data signal and to communicate the processed data signal to the transceiver, wherein the sensor analytics unit is programmed to capture waveform events and provide signature waveform identification.

* * * * *